(12) United States Patent
Sloan et al.

(10) Patent No.: US 10,395,422 B2
(45) Date of Patent: *Aug. 27, 2019

(54) PARTICIPATING MEDIA BAKING

(71) Applicant: Activision Publishing, Inc., Santa Monica, CA (US)

(72) Inventors: Peter-Pike Sloan, Santa Monica, CA (US); Adrien Dubouchet, Santa Monica, CA (US); Derek Nowrouzezahrai, Santa Monica, CA (US)

(73) Assignee: ACTIVISION PUBLISHING, INC., Santa Monica, CA (US)

( * ) Notice: Subject to any disclaimer, the term of this patent is extended or adjusted under 35 U.S.C. 154(b) by 18 days.

This patent is subject to a terminal disclaimer.

(21) Appl. No.: 15/783,958

(22) Filed: Oct. 13, 2017

(65) Prior Publication Data
US 2019/0114827 A1 Apr. 18, 2019

(51) Int. Cl.
*G06T 15/06* (2011.01)
*G06T 15/50* (2011.01)
*G06T 15/55* (2011.01)

(52) U.S. Cl.
CPC .......... *G06T 15/506* (2013.01); *G06T 15/06* (2013.01); *G06T 15/55* (2013.01)

(58) Field of Classification Search
CPC ....... G06T 15/06; G06T 15/50; G06T 15/506; G06T 15/55
See application file for complete search history.

(56) References Cited

U.S. PATENT DOCUMENTS 9,189,883 B1 * 11/2015 Hecht ................... G06T 15/60
2009/0167763 A1 * 7/2009 Waechter ............... G06T 15/06
345/426

(Continued)

OTHER PUBLICATIONS

Premože, Simon, et al. "Practical rendering of multiple scattering effects in participating media." Proceedings of the Fifteenth Eurographics conference on Rendering Techniques. 2004. (Year: 2004).*

(Continued)

*Primary Examiner* — Daniel F Hajnik
(74) *Attorney, Agent, or Firm* — Zilka-Kotab, P.C.

(57) ABSTRACT

According to one embodiment, a method includes identifying a scene to be rendered, pre-computing one or more lighting elements within the scene, including creating a plurality of light scattering tables, performing, during the pre-computing, a computation of light extinction and light in-scattering within participating media of the scene, utilizing the plurality of light scattering tables, and during a ray tracing of the scene, approximating spatially heterogeneous media of the scene as spatially homogeneous media of the scene by performing a volume intersection for each light ray associated with the spatially heterogeneous media of the scene to determine a homogeneous scattering coefficient for the light ray, and applying to the spatially heterogeneous media of the scene one of the plurality of light scattering tables, where each of the plurality of light scattering tables corresponds to a single homogeneous scattering coefficient, and a table lookup is adjusted for the one of the plurality of light scattering tables utilizing an analytic correction factor in order to apply the one of the plurality of light scattering tables with a different homogeneous scattering coefficient.

20 Claims, 7 Drawing Sheets

(56) References Cited

U.S. PATENT DOCUMENTS

| | | | | |
|---|---|---|---|---|
| 2011/0012901 A1* | 1/2011 | Kaplanyan | ............ | G06T 15/506 345/426 |
| 2012/0212496 A1* | 8/2012 | Kulla | ...................... | G06T 15/06 345/501 |
| 2012/0218549 A1* | 8/2012 | Gautron | ................ | G06T 15/506 356/337 |
| 2012/0256939 A1* | 10/2012 | Kulla | .................... | G06T 15/506 345/589 |
| 2013/0120384 A1* | 5/2013 | Jarosz | .................... | G06T 19/00 345/426 |
| 2013/0346041 A1* | 12/2013 | Gautron | .............. | G06F 17/5009 703/2 |
| 2014/0204087 A1* | 7/2014 | Habel | ................... | G06T 15/506 345/426 |

OTHER PUBLICATIONS

Vajta, M., "Some Remarks on Pade-Approximations," 3rd TEMPUS-INTCOM Symposium, Sep. 9-14, 2000, pp. 1-6.

Sloan et al., U.S. Appl. No. 15/783,940, filed Oct. 13, 2017.

Jarosz, W., "Efficient Monte Carlo Methods for Light Transport in Scattering Media," Dissertation, 2008, pp. 1-220.

Kulla et al., "Importance Sampling Techniques for Path Tracing in Participating Media," Eurographics Symposium on Rendering, vol. 31, No. 4, 2012, pp. 1-10.

Zhao et al., "High-Order Similarity Relations in Radiative Transfer," SIGGRAPH, 2014, pp. 1-12.

\* cited by examiner

PARTICIPATING MEDIA BAKING

FIELD OF THE INVENTION

The present invention relates to computer graphics rendering, and more particularly to pre-computation processes that are performed prior to real-time graphics rendering.

BACKGROUND

One goal of computer graphics rendering is to achieve results that are accurate and realistic. Accounting for light extinction and light in-scattering occurring within participating media of a scene helps achieve these accurate and realistic results. However, traditional rendering methods fail to consider light extinction and light in-scattering within participating media in a fast, efficient manner.

SUMMARY

A computer program embodied on a tangible computer readable medium includes computer code for identifying a scene to be rendered, computer code for pre-computing one or more lighting elements within the scene, including creating a plurality of light scattering tables, computer code for performing, during the pre-computing, a computation of light extinction and light in-scattering within participating media of the scene, utilizing the plurality of light scattering tables; and computer code for, during a ray tracing of the scene, approximating spatially heterogeneous media of the scene as spatially homogeneous media of the scene by performing a volume intersection for each light ray associated with the spatially heterogeneous media of the scene to determine a homogeneous scattering coefficient for the light ray, and applying to the spatially heterogeneous media of the scene one of the plurality of light scattering tables, where each of the plurality of light scattering tables corresponds to a single homogeneous scattering coefficient, and a table lookup is adjusted for the one of the plurality of light scattering tables utilizing an analytic correction factor in order to apply the one of the plurality of light scattering tables with a different homogeneous scattering coefficient.

According to another embodiment, a method includes identifying a scene to be rendered, pre-computing one or more lighting elements within the scene, including creating a plurality of light scattering tables, performing, during the pre-computing, a computation of light extinction and light in-scattering within participating media of the scene, utilizing the plurality of light scattering tables, and during a ray tracing of the scene, approximating spatially heterogeneous media of the scene as spatially homogeneous media of the scene by performing a volume intersection for each light ray associated with the spatially heterogeneous media of the scene to determine a homogeneous scattering coefficient for the light ray, and applying to the spatially heterogeneous media of the scene one of the plurality of light scattering tables, where each of the plurality of light scattering tables corresponds to a single homogeneous scattering coefficient, and a table lookup is adjusted for the one of the plurality of light scattering tables utilizing an analytic correction factor in order to apply the one of the plurality of light scattering tables with a different homogeneous scattering coefficient.

A system according to another embodiment includes a processor for identifying a scene to be rendered, pre-computing one or more lighting elements within the scene, including creating a plurality of light scattering tables, performing, during the pre-computing, a computation of light extinction and light in-scattering within participating media of the scene, utilizing the plurality of light scattering tables, and during a ray tracing of the scene, approximating spatially heterogeneous media of the scene as spatially homogeneous media of the scene by performing a volume intersection for each light ray associated with the spatially heterogeneous media of the scene to determine a homogeneous scattering coefficient for the light ray, and applying to the spatially heterogeneous media of the scene one of the plurality of light scattering tables, where each of the plurality of light scattering tables corresponds to a single homogeneous scattering coefficient, and a table lookup is adjusted for the one of the plurality of light scattering tables utilizing an analytic correction factor in order to apply the one of the plurality of light scattering tables with a different homogeneous scattering coefficient.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Figure 1:
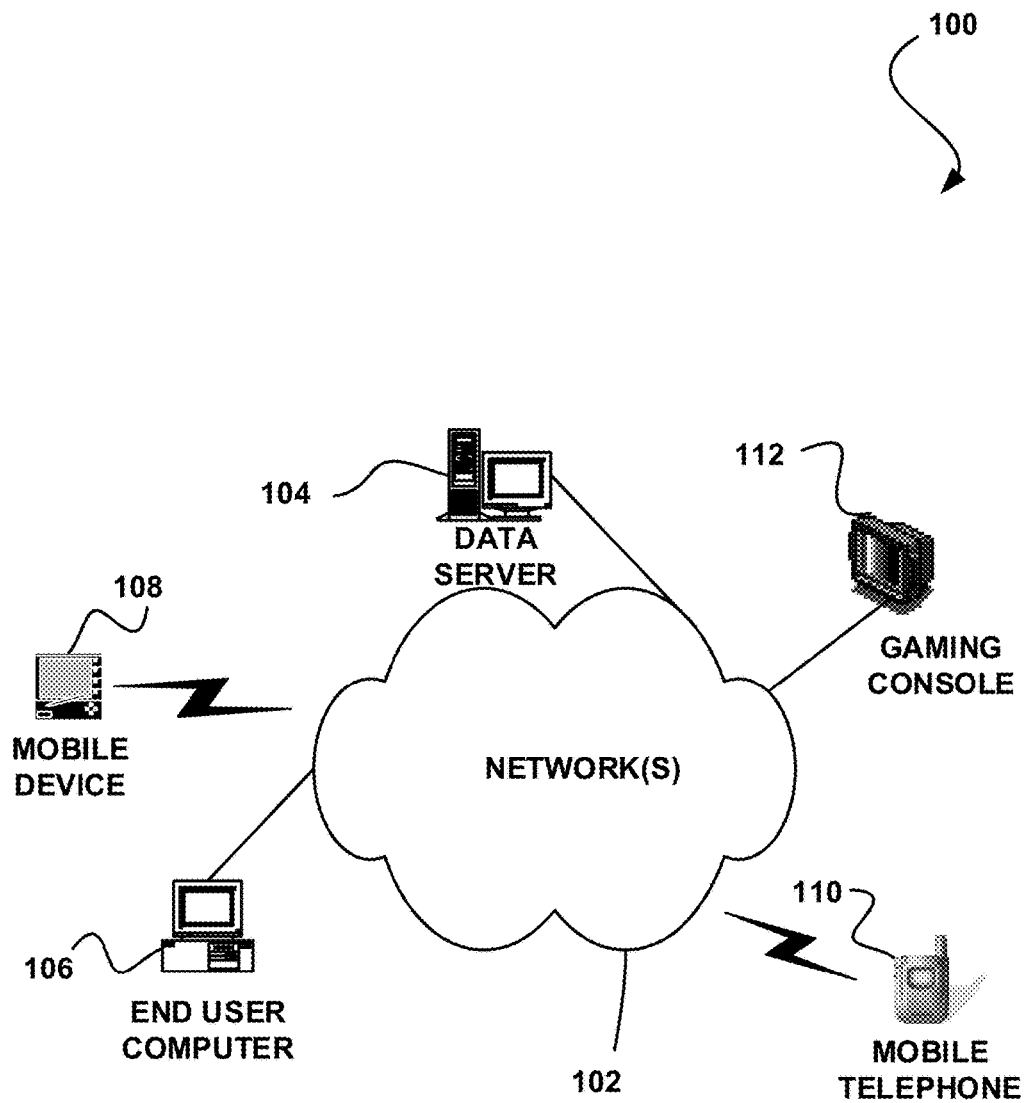
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, laptop computer, and/or any other type of logic. Still yet, various other devices may be coupled to the network 102 including a mobile device 108 (e.g., a tablet, a portable gaming device, etc.), a mobile phone device 110, a gaming console 112 (e.g., a dedicated console, a media device that enables gameplay, etc.), etc.

Figure 2:
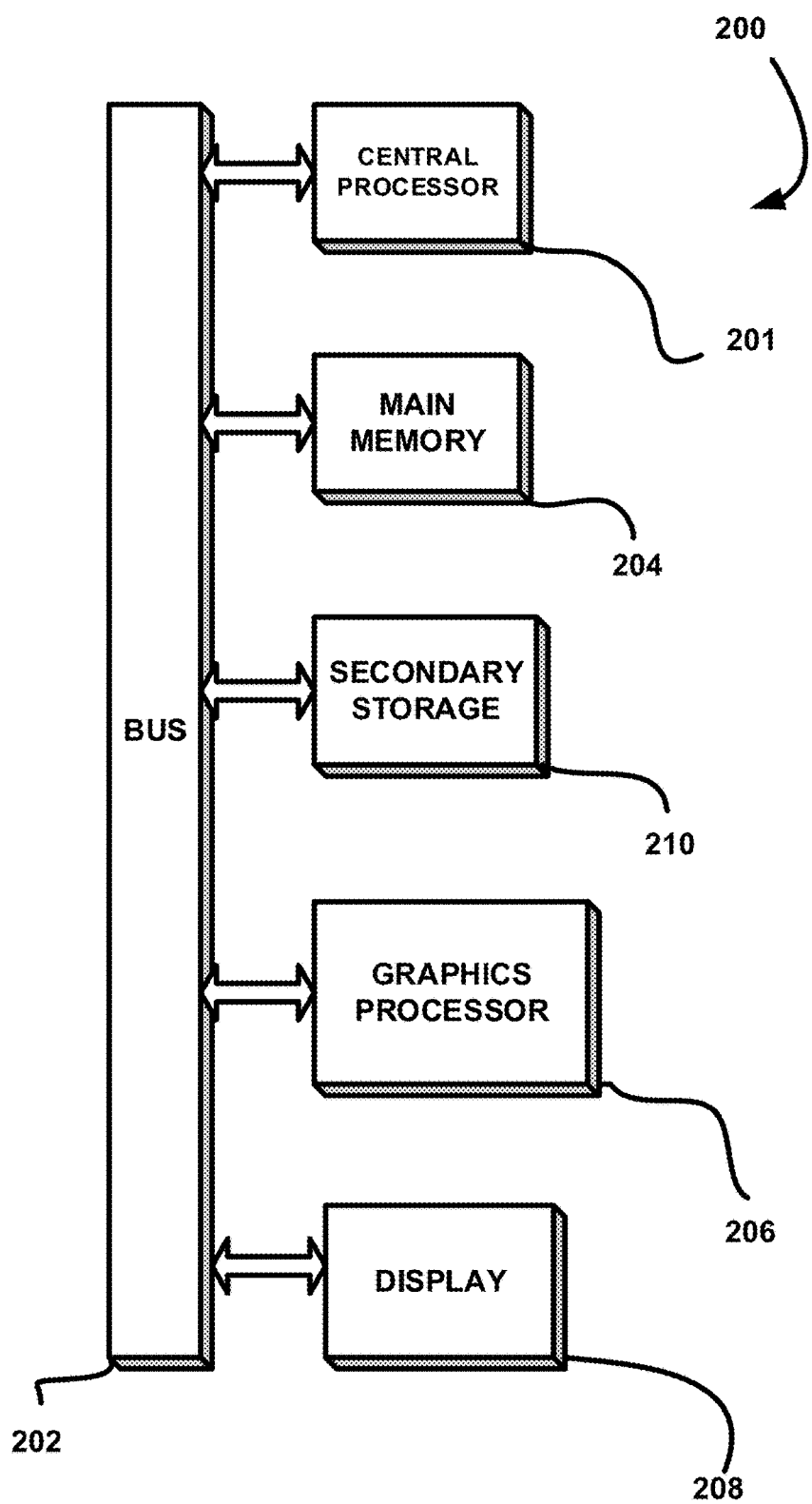
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). One or more computer programs may be embodied on a tangible computer readable medium. Examples of tangible computer readable media include, but are not limited to, memory 204, storage 210, volatile or non-volatile storage, etc. Additional examples of tangible computer readable media include, but are not limited to, portable storage media such as a disc, a cartridge, a non-volatile random access memory card, etc. Tangible computer readable media may also be non-transitory.

Figure 3:
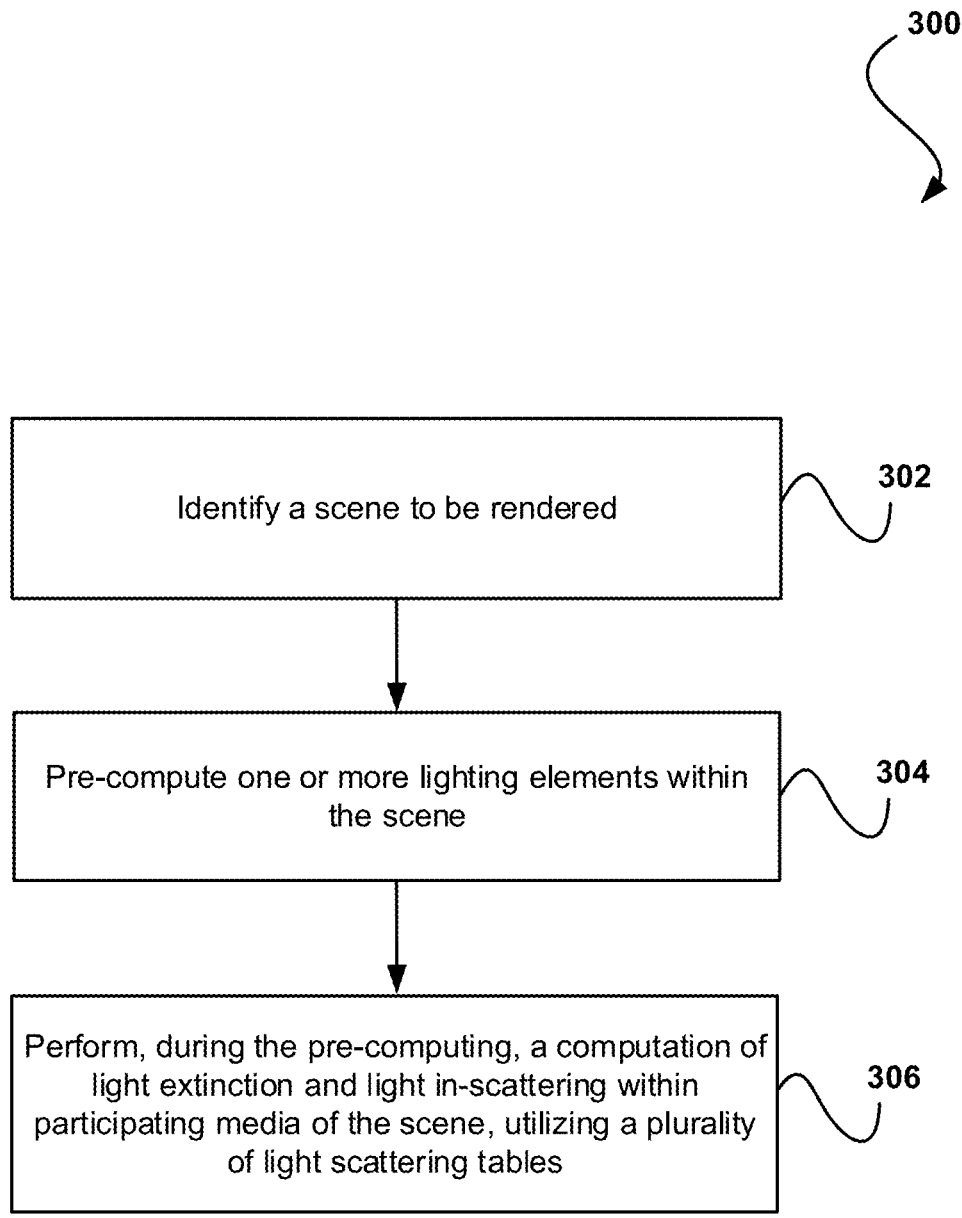
FIG. 3 illustrates a method for implementing participating media baking, in accordance with one embodiment.

FIG. 3 illustrates a method 300 for implementing participating media baking, in accordance with one embodiment. As an option, the method 300 may be carried out in the context of the details of FIGS. 1-2. Of course, however, the method 300 may be carried out in any desired environment. Further, the aforementioned definitions may equally apply to the description below.

As shown in operation 302, a scene to be rendered is identified. In one embodiment, the scene may include one or more light sources, one or more objects, etc. For example, the scene may include geometry, a viewpoint, one or more textures, lighting information, shading information, etc. In another embodiment, the scene may include a portion of a video game. In yet another embodiment, the rendering may include a process of generating an image from a model, utilizing one or more computer programs.

Additionally, as shown in operation 304, one or more lighting elements within the scene are pre-computed. In one embodiment, the one or more lighting elements may include indirect light (e.g., global illumination, etc.) within the scene. In another embodiment, the pre-computing may include performing one or more baking operations. For example, the baking operations may include precomputation operations that are performed prior to a real-time rendering of the scene (e.g., a ray tracing of the scene, etc.). In another example, the results of the baking operations may be stored in one or more lighting maps. In yet another example, the results of the baking operations may be utilized during the real-time rendering of the scene.

Further, as shown in operation 306, a computation of light extinction and light in-scattering within participating media of the scene is performed during the pre-computing, utilizing a plurality of light scattering tables. In one embodiment, the computation of light extinction and light in-scattering associated with participating media may be performed during the baking process. In another embodiment, the participating media may include media within a scene that affects light that travels through the media. For example, the participating media may include elements within the scene such as fog, clouds, smoke, water, etc. In another example, the light travelling through the participating media may be absorbed, out-scattered, emitted, in-scattered, etc. In yet another example, the participating media may include spatially heterogeneous media and/or spatially homogeneous media.

Further still, in one embodiment, the light extinction may include light absorption and light out-scattering within the participating media. In another embodiment, the computation of light extinction and light in-scattering within participating media may be performed during the pre-computing in an accelerated manner.

Also, in one embodiment, each of the plurality of light scattering tables may identify a spherical distribution of in-scattered light for a predetermined point during a simulation of indirect light. For example, each light scattering table may identify zonal harmonics (ZH) of an in-scattering impulse response. In another embodiment, each light scattering table may be created by parameterizing the in-scattering impulse response as a function of distance (for point light (PL) and directional light (DL)). In yet another embodiment, each light scattering table may be created by parameterizing the in-scattering impulse response as a function of distance and angle (for a differential area light such as a differential patch light (DPL)).

In addition, in one embodiment, each light scattering table may be created by projecting a function into ZH at a predetermined position, where the function includes a spherical integral of the unoccluded accumulated in-scattered radiance at the predetermined position. In another embodiment, one or more of the plurality of light scattering tables may be queried during the baking process. For example, during the baking/pre-computing, one or more lookups may be performed on one or more of the light scattering tables.

Furthermore, in one embodiment, each of the plurality of light scattering tables may be associated with a predetermined light type. In another embodiment, the light types may include point light (PL), directional light (DL), differential patch light (DPL), etc. For example, the point light may include a light source in space. In another example, the directional light may include a light source that is infinitely far away that is constantly coming from one direction (e.g., sun/skylight). In yet another example, the differential patch light may include light that reflects off a surface.

Further still, in one embodiment, each of the plurality of light scattering tables may address spatially homogeneous media. For example, the participating media may include spatially homogeneous media that is uniform throughout. For instance, scattering parameters may be independent of location within the homogeneous media. In this way, homogeneous media may have a constant scattering coefficient.

In another embodiment, each table may store results of projecting a signal (e.g., a light signal associated with a predetermined light type) onto ZH for a varying scattering coefficient value, distance value, and angle value. In this way, during baking/pre-computing, a lookup may be performed within the light scattering tables to determine an amount of light energy produced within the participating media. This amount of light energy may be used to compute light extinction and light in-scattering within participating media of the scene. For example, the amount of light energy may be applied to one or more formulas and/or sampling methods used to determine light extinction and light in-scattering within the participating media of the scene.

Also, in one embodiment, each of the light scattering tables may address spatially heterogeneous media. For example, the participating media may include spatially heterogeneous media that is not uniform throughout. For instance, scattering parameters may vary or may be dependent on a location within the heterogeneous media.

In another embodiment, light scattering tables corresponding to each of a plurality of homogeneous scattering coefficients may be determined during the pre-computing. For example, during ray tracing of the scene, a homogeneous scattering coefficient may be determined for spatially homogeneous media within the scene. A previously determined light scattering table corresponding to the homogeneous scattering coefficient may then be applied to the homogeneous media of the scene during the ray tracing.

In another example, during ray tracing of the scene, spatially heterogeneous media within the scene may be approximated as spatially homogeneous media within the scene by performing a volume intersection for each light ray associated with such participating media of the scene to determine a corresponding homogeneous scattering coefficient for the light ray, where the homogeneous scattering coefficient for the light ray is included within the plurality of homogeneous scattering coefficients. A previously determined light scattering table corresponding to the homogeneous scattering coefficient for each light ray may then be applied to the heterogeneous media of the scene during the ray tracing. In this way, a per-ray homogeneous coefficient may be used to simulate spatially heterogeneous media and/or spatially homogeneous media.

Additionally, in one embodiment, the light scattering tables may account for both single scattering and multiple scattering. For example, single scattering may include an instance where a light ray experiences a single scattering event at a point between the source and destination (e.g., eye, etc.). In another example, multiple scattering may include an instance where a light ray experiences multiple scattering events at multiple points between the source and destination (e.g., eye, etc.).

Further, in one embodiment, variance reduction may be performed within the plurality of light scattering tables. For example, performing variance reduction may include performing equiangular sampling along each path ray when creating each light scattering table. In another example, performing variance reduction may include performing directional importance sampling when creating each light scattering table.

Further still, in one embodiment, different parameterizations may be performed for different light types when creating the plurality of light scattering tables. In another embodiment, a light scattering table for a single scattering coefficient may be used with any other scattering coefficient with no approximation error (e.g., by adjusting a table lookup, by utilizing a correction factor such as an analytic correction factor, etc.). For example, creating the plurality of light scattering tables may include generating a single light scattering table for each of a plurality of different light types (e.g., PL, DL, DPL, etc.), where each light scattering table is associated with a first homogeneous scattering coefficient.

Additionally, a table lookup may be adjusted utilizing an analytic correction factor in order to utilize an existing light scattering table with a second homogeneous scattering coefficient. The analytic correction factor may act as remapping logic and may modify one or more of distance and lighting values of the existing light scattering table in order to utilize the existing light scattering table with the second homogeneous scattering coefficient. In yet another embodiment, the plurality of light scattering tables may address both isotropic and anisotropic phase functions.

In this way, the plurality of light scattering tables may be referenced during the pre-computing of one or more lighting elements within the scene in order to compute light extinction and light in-scattering within participating media of the scene in an accelerated manner.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
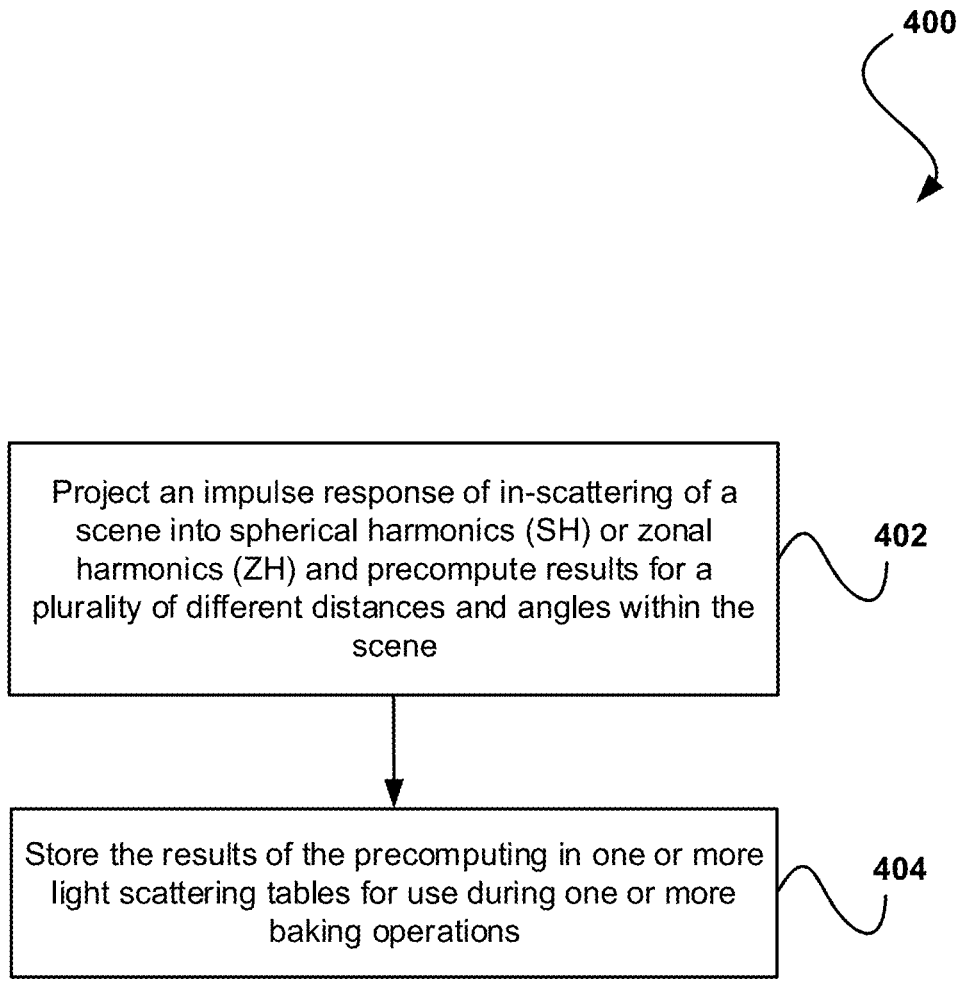
FIG. 4 illustrates a method for creating light scattering tables, in accordance with one embodiment.

FIG. 4 illustrates a method 400 for creating light scattering tables, in accordance with one embodiment. As an option, the method 400 may be carried out in the context of the details of FIGS. 1-2. Of course, however, the method 400 may be carried out in any desired environment. Further, the aforementioned definitions may equally apply to the description below.

As shown in operation 402, an impulse response of in-scattering of a scene is projected into spherical harmonics (SH) or zonal harmonics (ZH) and results are precomputed for a plurality of different distances and angles within the scene.

Additionally, as shown in operation 404, the results of the precomputing are stored in one or more light scattering tables for use during one or more baking operations. In this way, the one or more light scattering tables may be queried during one or more baking operations prior to a real-time rendering of a scene.

Figure 5:
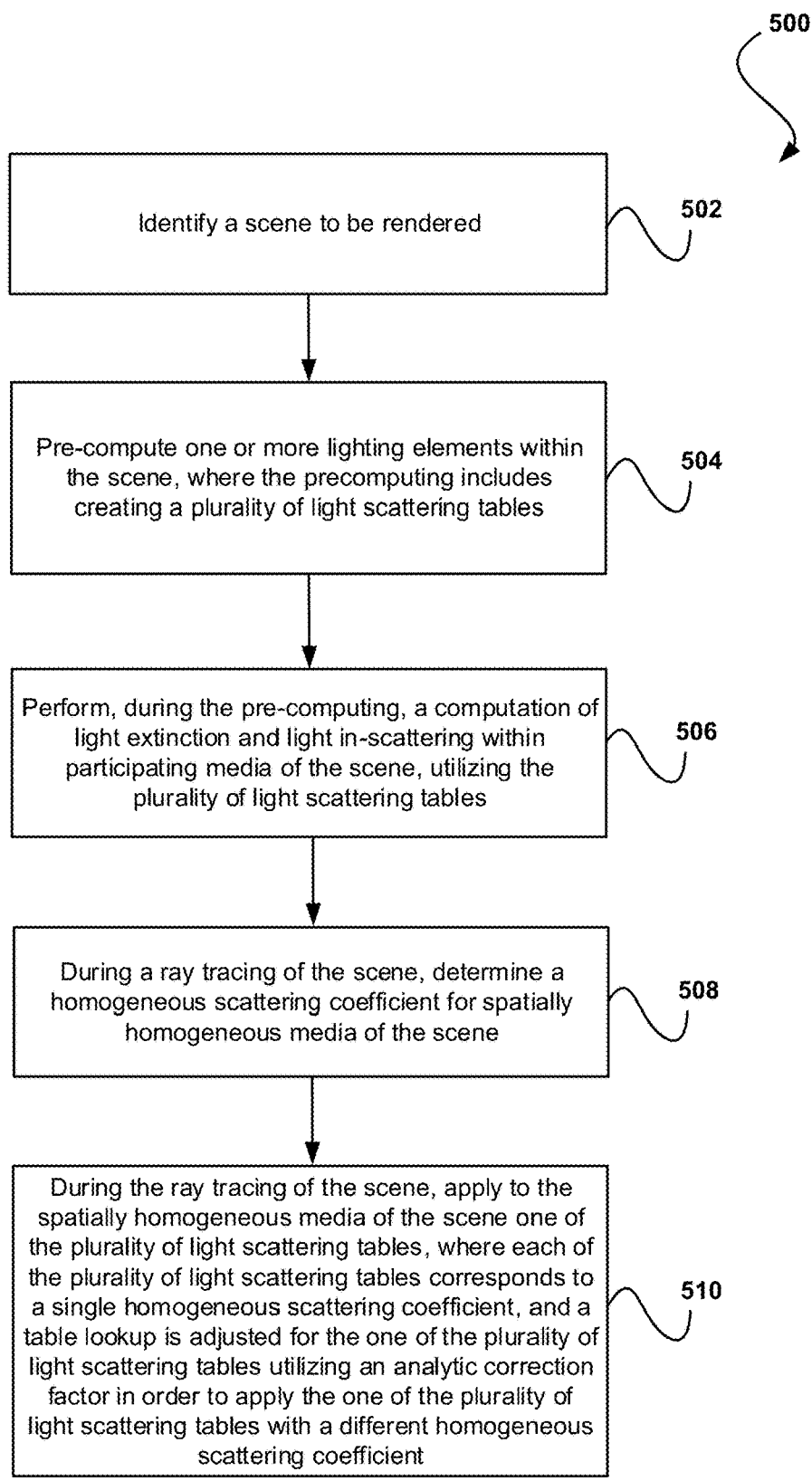
FIG. 5 illustrates a method for performing media baking for spatially homogeneous media, in accordance with one embodiment.

FIG. 5 illustrates a method 500 for performing media baking for spatially homogeneous media, in accordance with one embodiment. As an option, the method 500 may be carried out in the context of the details of FIGS. 1-2. Of course, however, the method 500 may be carried out in any desired environment. Further, the aforementioned definitions may equally apply to the description below.

As shown in operation 502, a scene to be rendered is identified. Additionally, as shown in operation 504, one or more lighting elements are precomputed within the scene, where the precomputing includes creating a plurality of light scattering tables.

Further, as shown in operation 506, during the pre-computing, a computation of light extinction and light in-scattering is performed within participating media of the scene, utilizing the plurality of light scattering tables. Further still, as shown in operation 508, during a ray tracing of the scene, a homogeneous scattering coefficient is determined for spatially homogeneous media of the scene. Also, as shown in operation 510, during the ray tracing of the scene, one of the plurality of light scattering tables is applied to the spatially homogeneous media of the scene, where each of the plurality of light scattering tables corresponds to a single homogeneous scattering coefficient, and a table lookup is adjusted for the one of the plurality of light scattering tables utilizing an analytic correction factor in order to apply the one of the plurality of light scattering tables with a different homogeneous scattering coefficient (e.g., when the determined homogeneous scattering coefficient is different from the single homogeneous scattering coefficient corresponding to the light scattering table).

Figure 6:
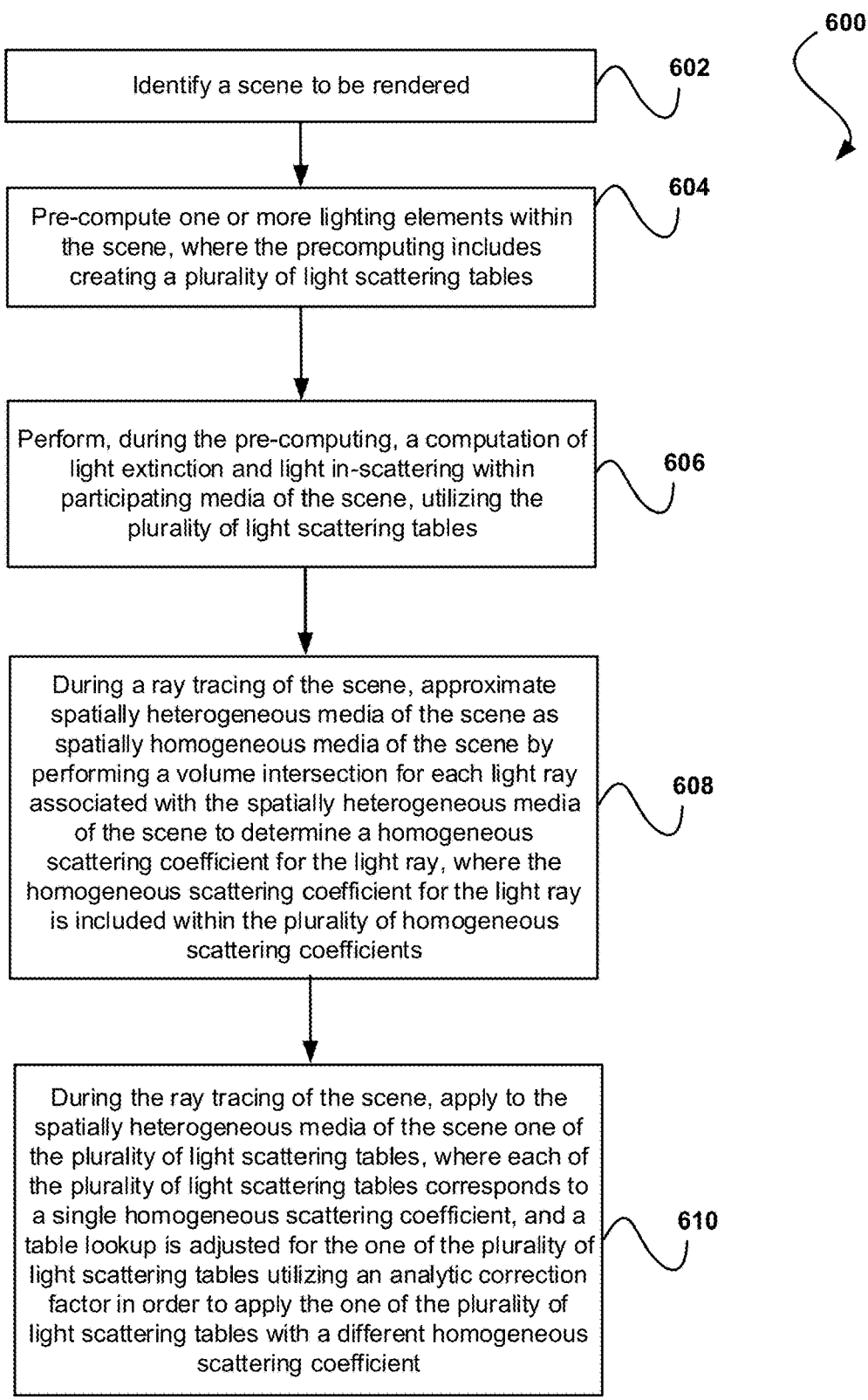
FIG. 6 illustrates a method for performing media baking for spatially heterogeneous media, in accordance with one embodiment.

FIG. 6 illustrates a method 600 for performing media baking for spatially heterogeneous media, in accordance with one embodiment. As an option, the method 600 may be carried out in the context of the details of FIGS. 1-2. Of course, however, the method 600 may be carried out in any desired environment. Further, the aforementioned definitions may equally apply to the description below.

As shown in operation 602, a scene to be rendered is identified. Additionally, as shown in operation 604, one or more lighting elements are precomputed within the scene, where the precomputing includes creating a plurality of light scattering tables.

Further, as shown in operation 606, during the precomputing, a computation of light extinction and light in-scattering is performed within participating media of the scene, utilizing the plurality of light scattering tables. Further still, as shown in operation 608, during a ray tracing of the scene, spatially heterogeneous media of the scene is approximated as spatially homogeneous media of the scene by performing a volume intersection for each light ray associated with the spatially heterogeneous media of the scene to determine a homogeneous scattering coefficient for the light ray, where the homogeneous scattering coefficient for the light ray is included within the plurality of homogeneous scattering coefficients. Also, as shown in operation 610, during the ray tracing of the scene, one of the plurality of light scattering tables is applied to the spatially heterogeneous media of the scene, where each of the plurality of light scattering tables corresponds to a single homogeneous scattering coefficient, and a table lookup is adjusted for the one of the plurality of light scattering tables utilizing an analytic correction factor in order to apply the one of the plurality of light scattering tables with a different homogeneous scattering coefficient (e.g., when the determined homogeneous scattering coefficient is different from the single homogeneous scattering coefficient corresponding to the light scattering table).

Accounting for light extinction and in-scattering during baking is valuable during rendering. For example, rendering engines may consider extinction and in-scattering from the point of view of the eye. However, surfaces don't get this attention and as you get closer to a surface in media, it may be presented as unrealistically bright. By addressing extinction and in-scattering during the baking process, lighting issues may be improved during surface rendering involving participating media.

Participating Media

Table 1 includes a formula illustrating how light interacts with participating media, in accordance with one embodiment. Of course, it should be noted that the formula shown in Table 1 is set forth for illustrative purposes only, and thus should not be construed as limiting in any manner.

TABLE 1

$$(\vec{\omega} \cdot \nabla)L(x \to \vec{\omega}) =$$

$$\underbrace{-\sigma_a(x)L(x \to \vec{\omega}) - \sigma_s(x)L(x \to \vec{\omega})}_{\text{extinction}} + \underbrace{\sigma_a(x)L_e(x \to \vec{\omega})}_{\text{emission}} + \underbrace{\sigma_s(x)L_i(x \to \vec{\omega})}_{\text{in-scattering}}$$

Table 2 illustrates exemplary participating media parameters, in accordance with one embodiment. Of course, it should be noted that the parameters shown in Table 2 are set forth for illustrative purposes only, and thus should not be construed as limiting in any manner.

TABLE 2

| Parameter | Value |
| --- | --- |
| scattering coefficient governing out- and in-scattering | $\sigma_s$ |
| absorption coefficient | $\sigma_a$ |
| extinction coefficient | $\sigma_t = \sigma_s + \sigma_a$ |
| phase function | $\rho(x, \vec{\omega}_t, \vec{\omega})$ with isotropic $\rho = \frac{1}{4\pi}$ |
| transmittance through media | $T_r(x \leftrightarrow x_s) = e^{-\sigma_t d_{x \leftrightarrow x_s}}$, with $d_{x \leftrightarrow x_s}$ the distance between x and $x_s$ |
| in-scattering source factor | $L_i(x_t, \vec{\omega}) = \int_{\Omega_{4\pi}} \rho(x_t, \vec{\omega}_t, \vec{\omega})L(x_t, \vec{\omega}_t)d\vec{\omega}_t$, at position $x_t$ in direction $\vec{\omega}$ |

Precomputation

In one embodiment, light scattering tables (e.g., tables of ZH of in-scattering impulse response, etc.) may be precomputed, where such tables may be fast and easy to query at bake time (e.g., utilizing linear interpolation over the table). In another embodiment, the in-scattering impulse response may be parametrized as a function of distance (and angle for DPL).

In one embodiment, the function projected onto ZH at position x, $f(x) = \int_{\Omega_{4\pi}} L(x, \vec{\omega}) d\vec{\omega}$, may be the spherical integral of the unoccluded accumulated in-scattered radiance:

$$L(x, \vec{\omega}) = \int_0^{28} T_r(x \leftrightarrow x_t)\sigma_s(x_t)L_i(x_t, -\vec{\omega})dt,$$

where $L_i(x_t, \vec{\omega})$ is defined as the in-scattering source factor at position $x_t$ in direction $\vec{\omega}$:

$$L(x, \vec{\omega}) = \int_{\Omega_{4\pi}} \rho(x_t, \vec{\omega}_t, \vec{\omega}_t)L(x_t, \vec{\omega}_t)d\vec{\omega}_t.$$

Computing In-scattering for Homogeneous Media

In one embodiment, in-scattering may be computed utilizing equi-angular sampling. In another embodiment, in-scattering may be computed utilizing Cone-Anti-Cone directional importance sampling, according to the following formula:

$$x = \sum_i \frac{c_i}{c_0} \cdot \int_0^{2\pi} \int_0^a y_l^0 \sin(\theta)d\theta d\phi,$$

where x includes the percentage of samples to distribute in the cone, and 1−x is the ratio of samples given to the anti-cone. In one embodiment, the above formula may be solved for the best ratio x (e.g., utilizing parabolic interpolation, etc.).

Additionally, in one embodiment, density sampling may be performed until the last scattering event, and then IS methods may be used to go back to the light source. In another embodiment, Cone/Anti-Cone sampling may be used for the first and last spherical integrations. In yet another embodiment, an in-scattering ZH fit may be used to sample inscattering.

Further, in one embodiment, there may be a constant scattering coeffecient σ over an infinite homogeneous media. For each type of light (e.g., point, directional, differential patch, etc.), the associated signal may be projected onto ZH, for varying sigma, distance, and angle. Results may then be tabulated, with one table being created per light type.

Further still, in one embodiment, a DPL's signal may be circularly symmetric for a direction along the normal of the patch. A shift angle may include a parameterization of the optimal signal direction to encode as a ZH (e.g., the lobe axis). In another embodiment, encoding may use the frame defined by the source, the vector from the source to the receiver, and the normal (since the optimal lobe may always be on the plane intersecting the source in the span of those two vectors). The ZH may be fit over the DLP's signal, and the ZH main axis may be found using least-square interpolation between light direction and the SH's optimal linear direction. An additional shift angle may also be stored.

Approximating Heterogeneous Media

In one embodiment, heterogeneous media may have spatially varying density. For example, the heterogeneous media may be procedural, may from a data structure (AABB, OBB, Octree, etc.), etc. In another embodiment, every ray passing through heterogeneous media may need to understand how the density varies along it in order to effectively sample steps (e.g., by performing density sampling according to the cdf of σ) and compute the source factor at those positions.

Additionally, in one embodiment, heterogeneous media may be approximated as directionally varying homogeneous media. For example, each ray shot from a receiver point may possess a single set of scattering and absorption coefficients. This reduction is exact for direct transmission, as the transmittance is:

$$e^{-\frac{\Sigma_i \sigma_i d_i}{D}} == \Pi_i e^{-\sigma_i d_i},$$

and the product of the individual transmittances is equal to the transmittance of the average sigma for a given ray length. For in-scattering, this may be an approximation, as in-scattered rays may pass through non-colinear media locations. In another embodiment, a single extinction coefficient $$\sigma_t = \frac{\Sigma_i \sigma_i d_i}{D}$$

may be approximated over a ray of length D. In this way, a per-ray homogeneous coefficient may be used to simulate spatially heterogeneous media.

Figure 7:
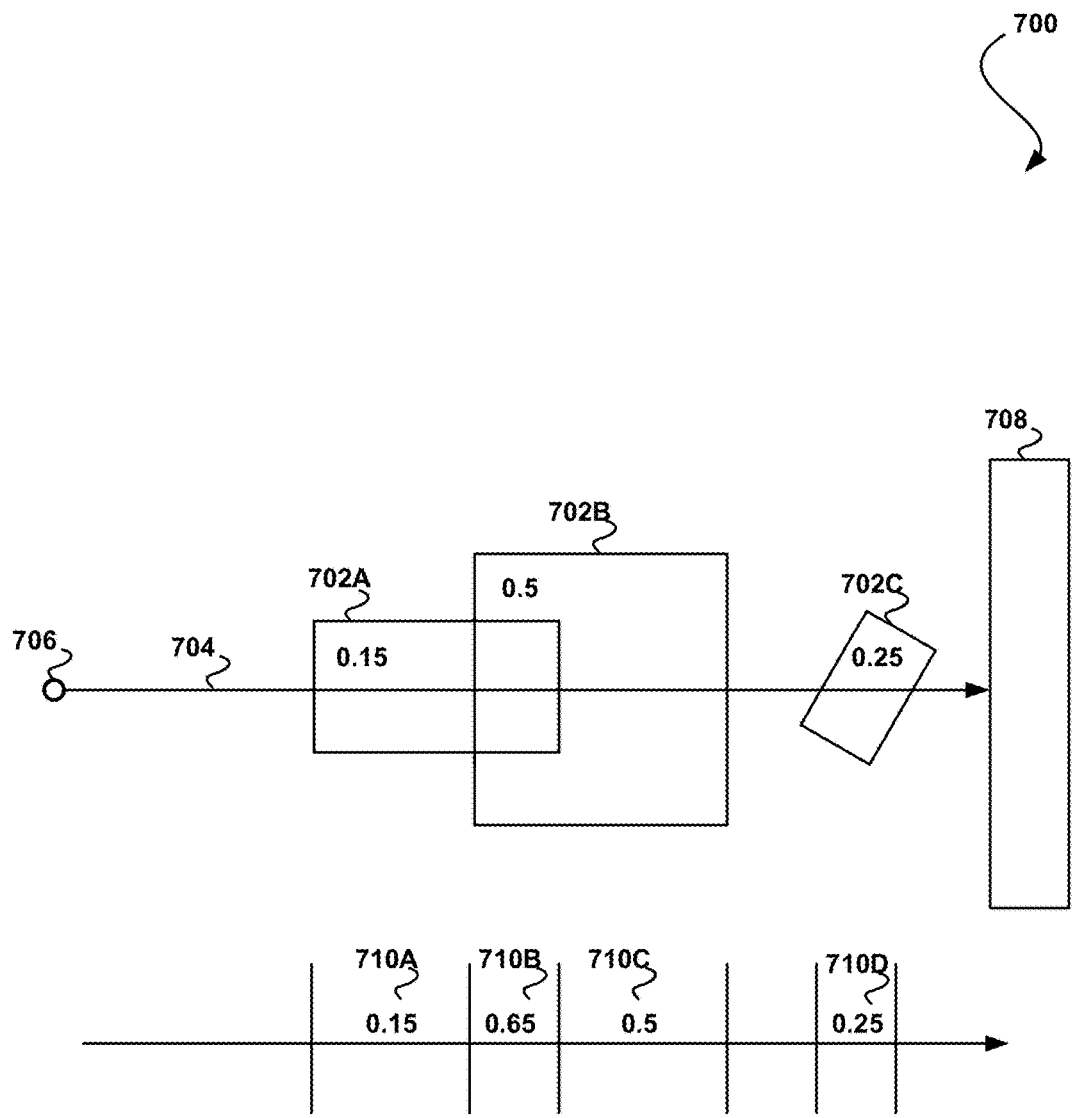
FIG. 7 illustrates an exemplary volume intersection analysis for determining a scattering coefficient for heterogeneous media, in accordance with one embodiment.

FIG. 7 illustrates an exemplary volume intersection analysis 700 for determining a scattering coefficient for heterogeneous media, according to one embodiment. As shown, the heterogeneous media is viewed as a plurality of volumes 702A-C that are identified as being intersected by a ray 704 originating at a receiver point 706 and terminating at a hit point 708. Associated scattering coefficients 510A-D are determined, based on the intersection, and these coefficients 710A-D are averaged in order to determine a scattering coefficient for the heterogeneous media.

Phase Function

In one embodiment, an exemplary phase function for performing baked extinction and in-scattering may include:

$$\rho(\cos(\theta)) = \Sigma_i \omega_i b_i(\cos(\theta))$$

for single scattering. In another embodiment, a similarity theory $\sigma_t(1-g)$ may be applied, as it may be better fitted for higher-K scattering events since it may be modeled well for the 0th moment. In another embodiment, σ-remapping from an anisotropic to an isotropic phase function may be performed for impulse response type functions.

Additionally, in one embodiment, anisotropic phase functions may be addressed by performing a precomputation independent of scattering. A tensor of coefficients may be used for multiple scattering events. This may be multiplied on multiple sides by phase function coefficients to obtain an incident impulse response for different phase functions.

Fitting In-scattering to Zonal Harmonics

In one embodiment, in-scattering from PL and DL may be isotropic signals. Their contribution may be projected directly to ZH. In another embodiment, in-scattering from DPL may be isotropic along the DPL's normal axis but the signal may become anisotropic if gathered at a point at an angle from that axis. In yet another embodiment, a shift distance may be found by a parabolic search of fitting the DPL's spherical harmonics (SH) to ZH at different main axes between the light direction and the optimal linear direction vector (-SH[3]; -SH[1]; SH[2]).

In this way, for PL and DL, an isotropic signal may be projected onto ZH directly. For DPL, the signal may be projected onto SH, and the main axis of incidence may be shifted in the patch normal's direction. A ZH may be fit over the SH coefficients around this axis, and the ZH coefficients as well as the shift distance may be stored.

Table Parametrization

In one embodiment, different parametrization may be utilized for different light types. In another embodiment, independent parametrizations for close and far distances from the light may be applied to fit the underlying data. For example, the distance distribution may be between 1/d and $1/d^2$, and the behavior may get closer to one or the other depending on distance.

Additionally, in one embodiment, table parameterization may be linear over cos(θ) for DPL angles. The parameterization may be bounded between cos(θ)=1 for the incident direction and cos(θ)=ϵ for the most oblique direction.

Further, in one embodiment, a gradient fit may be implemented for PL & DPL so that extrapolation may be possible when querying distances closer to a light than data is provided for. For those light types tables, the average gradient of the data may be identified over a small local range (e.g., half of the local (close distances) parametrization) and the sum of that gradient may be stored as well as the value at the second index in the first index of those tables. When querying, negative weights may be allowed so as to extrapolate from those two first indices' values. DL may not store the gradient since the nature of the table makes it so that $\lim_{x \to 0} L(x) = 0$.

Further still, in one embodiment, each table may store a header containing values pertaining to the table's parametrization. First, a number of distance entries and a number of ZH bands may be stored in the header. Each table may store its first, mid and last indices (nx0, nx1, nx2), as well as the distance values at those indices (x0, x1, x2). DPL may also store the information related to angular sampling, such as a number of angle entries, and the value of cos(θ) at the first and last indices, $\cos(\theta_0)$ and $\cos(\theta_\epsilon)$ respectively.

Query & Baking

In one embodiment, the tables may be queried at bake time for every radiance ray depending on the type of light and the type of receiver (e.g., scalar: lightmap texel, vertex, or vector: SH probe, etc.). In another embodiment, from a query distance (and angle for DPL), the modified distance and weight may be computed depending on the table's σ-ratio. The modified distance d may then be used to find the index and weight for the linear interpolation in the table. Since two parametrizations may be used per table, d may first be compared with the x0, x1, x2 bounds to determine which parametrization to lookup, and the floating-point index i=$a_a$*d+$b_a$ may be returned. For DPL, the cosine of the angle between the query direction and the patch's normal may be used as a linear weight between the two cosine bounds cos($\theta_0$) and cos($\theta_e$) to find the angular index.

Additionally, in one embodiment, those indices may be used to lookup the tables, and linear (or bilinear for DPL) interpolation between discrete indices may be performed. Since the tables may be constructed to allow interior extrapolation at table boundaries, the lookup may solve those boundary cases. In another embodiment, when considering multiple bounces of in-scattering, lookups may be performed in each bounce table sequentially, while accumulating the coefficients and updating the per-bounce weight as the lookups progress.

Further, in one embodiment, for a DPL case, the computation may be altered when considering multiple bounces. For example, each bounce may have a different shift distance, and thus a different axis of SH evaluation. In this case, one SH evaluation may be performed per bounce before accumulation. In another embodiment, for the vector case, the receiver may be a SH itself, and the queried coefficients $c_l^m = \Sigma_l \Sigma_m y_l^m z_l$ may be directly added. In another embodiment, for a scalar case, the receiver may be a surface with a normal, and the queried ZH may be convolved with the cosine between the surface's normal and the light direction. For example, the integral of a ZH function may be computed in a direction without expanding it to full ZH (e.g., an 11-coefficient ZH may expand to 121 coefficients for SH). This may minimize a number of coefficients needed to compute the ZH function.

Further still, in one embodiment, both direct attenuation and in-scattering may be added, such as L(p)=$\int_\Omega L_i$(p, $\vec{\omega}$)($T_r$(p,$\vec{\omega}$)+InScattering(p,$\vec{\omega}$))d$\vec{\omega}$, where $L_i$(p,$\vec{\omega}$) is a wavelength-dependent function.

Varying the Scattering Coefficient

In one embodiment, the light scattering tables may contain the impulse response of in-scattering from a single light projected onto ZH at a single receiver point x. As a result, the projected function may be computed for a specific extinction coefficient $\sigma_t$. In another embodiment, the projected function may be interpolated from several tables generated from different $\sigma_t$, but in one embodiment, the behavior of the RTE may be viewed according to σ.

For example, if $\sigma_s$ is modified, both the transmittance terms $T_r$ and the scattering probability for the in-scattering may change. For $T_r$, the exponentiated term $-\sigma_t d$ may behaves predicatively if the σ changes, and modifying σ may amount to inversely modifying d. Thus, $e^{-\sigma_a d_a} = e^{-\sigma_b d_b}$ when $$d_a = \frac{\sigma_b}{\sigma_a} d_b.$$

From this observation, computing the in-scattering impulse responses for at $\sigma_t = \sigma_b$ and querying the resulting tables with $$d_q = \frac{\sigma_a}{\sigma_b} d_a$$

may solve the transmittance terms of the integrals.

Additionally, in one embodiment, each scattering event may have a probability $\sigma_s$. With a table computed with $\sigma_b$, it may be necessary to correct for this by a factor of $$\frac{\sigma_a}{\sigma_b},$$

which may be directly applied as a weight to the queried coefficients. This term may be called the σ-ratio. For punctual lights, the in-scattering may also incorporate the $$\frac{I_0}{d^2}$$

term. When querying the tables with the above $d_q$, this attenuation factor may be equally modified as $$\frac{I_0}{\left[\frac{\sigma_a}{\sigma_b} d_a\right]^2}.$$

This may be corrected for with an additional $$\frac{\sigma_a^2}{\sigma_b}$$

weight.

In this way, for a single scattering event, a correction factor of $$\frac{\sigma_a^3}{\sigma_b}$$

may be applied for punctual lights, and a correction factor of $$\frac{\sigma_a}{\sigma_b}$$

may be applied for directional lights. In term of integrals, the integral of in-scattering over a full ray may be $\int_0^{D_b} \sigma_b \rho(x_b) L_i(x_b) dx_b$, and the measure of the integral may cancel one of the σ-ratios.

Occlusion

In one embodiment, when looking at a peaky shape and solid angle (~5-6 deg) covered by lower-bounce in-scattering impulse response, considering occlusion more than the direct occlusion to the light source may be avoided. For example, low-bounce in-scattering may be added whenever direct attenuation is computed. For higher-bounces in-scattering, the signal may become much more diffuse at distances closer to the light source (e.g., as indicated by the ZH DC towering over the other bands). For this, an approximation to occlusion may be implemented. Since at this point the signal may be ambient, an AO-type occlusion function may be used to modulate the amount of added in-scattering.

Optimizations

In one embodiment, coarser sigma parametrization may be implemented. For example, instead of each ray computing its homogeneous σ, a coarser directional representation of σ may be used at each texel, cluster, etc. in a Cubemap/SH. Each ray may retrieve its extinction coefficient from this representation instead.

Additionally, in one embodiment, in-scattering may be computed on a subset of the rays used to compute radiance for a texel. Any uniform subset $$\left(M = \frac{1}{K}N\right)$$

of the radiance rays used for a lightmap texel may compute multiple-bounce in-scattering in a separate integral, which may then then be re-weighted by K to account for uncomputed ones.

Further, in one embodiment, one or more computations necessary at bake-time may be parallelized with SSE or AVX vector instructions. The table queries may be implemented using single-lane instructions. In another embodiment, multiple scattering may be implemented as a geometric series approximation $\Sigma_i \sigma_i \rho_i f_i(d)$.

Further still, in one embodiment, taking cues from photon mapping, points in the medium may be distributed and their source factor may be evaluated. Those points may be translated and rotated around the main light axis (e.g., the light to integration point for PL and DL, the patch normal for DPL, etc.). In another embodiment, connections may be made afterwards to compute the in-scattering from them all to the integration point.

Also, in one embodiment, the integration may be viewed as bi-directional path tracing, and photons may be traced from both the light and the integration point and connect. In another embodiment, after several bounces, a signal may become predominantly ambient for closer distances to the light. As a result, only the ZH DC may be used, by finding the distance cutoff point (in both bounce count and distances) where DC-only or every band may then be considered.

Variance Reduction

In one embodiment, for multiple scattering, at each scattering event, a connection may be made to the light (e.g., via an explicit path), and 3D integration may be repeated (e.g., via an implicit path). In another embodiment, equiangular sampling may be performed along each path ray. For example, the samples may be proportional to the light's $$\frac{1}{d^2}$$

term. This may cancel a weak singularity for single scattering.

Additionally, in one embodiment, a robust Monte Carlo algorithm may be implemented to reduce an outlier amount. For example, N passes of integrand computations may be made, and their SH coefficients may be stored. Additionally, the passes may be sorted according to the SH DC. The DC may be statistically analyzed to define small and large outliers, which may be removed from the computation. The expected value may then be computed from the remaining values.

In this way, the impulse response of scene in-scattering may be projected into SH or ZH and may be precomputed for different distances and angles. The results may be stored in precomputed tables that are queried during baking.

It will be clear that the various features of the foregoing systems and/or methodologies may be combined in any way, creating a plurality of combinations from the descriptions presented above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable medium, comprising:
   computer code for identifying a scene to be rendered;
   computer code for pre-computing one or more lighting elements within the scene, including creating a plurality of light scattering tables;
   computer code for performing, during the pre-computing, a computation of light extinction and light in-scattering within participating media of the scene, utilizing the plurality of light scattering tables; and
   computer code for, during a ray tracing of the scene:
   approximating spatially heterogeneous media of the scene as spatially homogeneous media of the scene by performing a volume intersection for each light ray associated with the spatially heterogeneous media of the scene to determine a homogeneous scattering coefficient for the light ray, and
   applying to the spatially heterogeneous media of the scene one of the plurality of light scattering tables, where each of the plurality of light scattering tables corresponds to a single homogeneous scattering coefficient, and a table lookup is adjusted for the one of the plurality of light scattering tables utilizing an analytic correction factor in order to apply the one of the plurality of light scattering tables with a different homogeneous scattering coefficient.

2. The computer program of claim 1, wherein the pre-computing includes performing one or more baking operations prior to the ray tracing of the scene.

3. The computer program of claim 1, wherein the light extinction includes light absorption and light out-scattering within the participating media of the scene.

4. The computer program of claim 1, wherein each of the plurality of light scattering tables identifies a spherical distribution of in-scattered light for a predetermined point during a simulation of indirect light.

5. The computer program of claim 1, wherein during the pre-computing, one or more lookups are performed on one or more of the plurality of light scattering tables.

6. The computer program of claim 1, wherein during the pre-computing, a lookup is performed within the plurality of light scattering tables to determine an amount of light energy produced within the participating media, where this amount of light energy is used to compute the light extinction and the light in-scattering within the participating media of the scene.

7. The computer program of claim 1, wherein each of the plurality of light scattering tables is associated with a predetermined light type, the predetermined light type including point light (PL), directional light (DL), or differential patch light (DPL).

8. The computer program of claim 7, wherein each of the plurality of light scattering tables that is associated with PL or DL is created by parameterizing an in-scattering impulse response as a function of distance.

9. The computer program of claim 7, wherein each of the plurality of light scattering tables that is associated with DPL is created by parameterizing an in-scattering impulse response as a function of distance and angle.

10. A method, comprising:
identifying a scene to be rendered;
pre-computing one or more lighting elements within the scene, including creating a plurality of light scattering tables;
performing, during the pre-computing, a computation of light extinction and light in-scattering within participating media of the scene, utilizing the plurality of light scattering tables; and
during a ray tracing of the scene:
approximating spatially heterogeneous media of the scene as spatially homogeneous media of the scene by performing a volume intersection for each light ray associated with the spatially heterogeneous media of the scene to determine a homogeneous scattering coefficient for the light ray, and
applying to the spatially heterogeneous media of the scene one of the plurality of light scattering tables, where each of the plurality of light scattering tables corresponds to a single homogeneous scattering coefficient, and a table lookup is adjusted for the one of the plurality of light scattering tables utilizing an analytic correction factor in order to apply the one of the plurality of light scattering tables with a different homogeneous scattering coefficient.

11. The method of claim 10, wherein the pre-computing includes performing one or more baking operations prior to the ray tracing of the scene.

12. The method of claim 10, wherein the light extinction includes light absorption and light out-scattering within the participating media of the scene.

13. The method of claim 10, wherein each of the plurality of light scattering tables identifies a spherical distribution of in-scattered light for a predetermined point during a simulation of indirect light.

14. The method of claim 10, wherein during the pre-computing, one or more lookups are performed on one or more of the plurality of light scattering tables.

15. The method of claim 10, wherein during the pre-computing, a lookup is performed within the plurality of light scattering tables to determine an amount of light energy produced within the participating media, where this amount of light energy is used to compute the light extinction and the light in-scattering within the participating media of the scene.

16. The method of claim 10, wherein each of the plurality of light scattering tables is associated with a predetermined light type, the predetermined light type including point light (PL), directional light (DL), or differential patch light (DPL).

17. The method of claim 16, wherein each of the plurality of light scattering tables that is associated with PL or DL is created by parameterizing an in-scattering impulse response as a function of distance.

18. The method of claim 16, wherein each of the plurality of light scattering tables that is associated with DPL is created by parameterizing an in-scattering impulse response as a function of distance and angle.

19. A system, comprising:
a processor for:
identifying a scene to be rendered;
pre-computing one or more lighting elements within the scene, including creating a plurality of light scattering tables;
performing, during the pre-computing, a computation of light extinction and light in-scattering within participating media of the scene, utilizing the plurality of light scattering tables; and
during a ray tracing of the scene:
approximating spatially heterogeneous media of the scene as spatially homogeneous media of the scene by performing a volume intersection for each light ray associated with the spatially heterogeneous media of the scene to determine a homogeneous scattering coefficient for the light ray, and
applying to the spatially heterogeneous media of the scene one of the plurality of light scattering tables, where each of the plurality of light scattering tables corresponds to a single homogeneous scattering coefficient, and a table lookup is adjusted for the one of the plurality of light scattering tables utilizing an analytic correction factor in order to apply the one of the plurality of light scattering tables with a different homogeneous scattering coefficient.

20. The system of claim 19, wherein the processor is coupled to memory via a bus.

* * * * *